(12) United States Patent
Son

(10) Patent No.: US 9,386,202 B2
(45) Date of Patent: Jul. 5, 2016

(54) CAMERA MODULE

(71) Applicant: LG INNOTEK CO., LTD., Seoul (KR)

(72) Inventor: Suk Woo Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 222 days.

(21) Appl. No.: 13/679,552

(22) Filed: Nov. 16, 2012

(65) Prior Publication Data

US 2013/0128100 A1 May 23, 2013

(30) Foreign Application Priority Data

Nov. 23, 2011 (KR) .................. 10-2011-0123084

(51) Int. Cl.
*H04N 5/225* (2006.01)
(52) U.S. Cl.
CPC ........... *H04N 5/2254* (2013.01); *H04N 5/2257* (2013.01)
(58) Field of Classification Search
CPC . H04N 5/2251; H04N 5/2252; H04N 5/2253; H04N 5/2254

USPC .......................................... 348/357, 373, 374
See application file for complete search history.

(56) References Cited

U.S. PATENT DOCUMENTS

| | | | | |
|---|---|---|---|---|
| 7,997,812 B2 * | 8/2011 | Kim | ............................... | 396/529 |
| 2007/0047938 A1 * | 3/2007 | Suzuki et al. | ................... | 396/89 |
| 2009/0128681 A1 * | 5/2009 | Kim | ............................... | 348/335 |
| 2009/0278978 A1 * | 11/2009 | Suzuki | ......................... | 348/345 |
| 2010/0158508 A1 * | 6/2010 | Kim | ............................... | 396/529 |
| 2011/0199530 A1 * | 8/2011 | Kosaka et al. | ................ | 348/340 |
| 2011/0236008 A1 * | 9/2011 | Kang et al. | ..................... | 396/133 |
| 2012/0218450 A1 * | 8/2012 | Pavithran et al. | ............. | 348/296 |

* cited by examiner

*Primary Examiner* — James Hannett
(74) *Attorney, Agent, or Firm* — Birch, Stewart, Kolasch & Birch, LLP

(57) ABSTRACT

Exemplary embodiments of a camera module are proposed, the camera module being such that a terminal formed at a holder is inserted into a through hole or a groove of a substrate in a case the substrate and the holder are coupled, to allow the terminal and the holder to be electrically connected.

14 Claims, 5 Drawing Sheets

CAMERA MODULE

Pursuant to 35 U.S.C. §119 (a), this application claims the benefit of earlier filing date and right of priority to Korean Patent Application No. 10-2011-0123084, filed on Nov. 23, 2011, the contents of which are hereby incorporated by reference in their entirety.

BACKGROUND OF THE DISCLOSURE

1. Field of the Disclosure

The teachings in accordance with exemplary embodiments of the present disclosure generally relate generally to a camera module.

2. Discussion of the Related Art

This section provides background information related to the present disclosure which is not necessarily prior art.

Generally, a camera module is an optical device capable of photographing an object by being mounted with a plurality of lenses. The optical device includes an actuator moving the lenses to a direction of an optical axis. The actuator realizes an auto focusing function by adjusting a focal length (focal distance) by transferring the lens to the direction of an optical axis, where the lens is embedded in a lens barrel.

A terminal connected to the actuator is required to apply a voltage to the actuator. The terminal in a conventional camera module is electrically connected to a substrate mounted with an image sensor, where the terminal is exposed to outside to be susceptible to an influence of electromagnetic wave transmitted from outside, and even if an EMI (Electromagnetic Interference) shield can is mounted to cover the camera module, the terminal and the EMI shield can are brought into contact to disadvantageously generate a short-circuit.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides a camera module configured to reduce an influence of electromagnetic wave transmitted from outside by positioning a terminal inside the camera module to prevent the terminal from being exposed, and to prevent a short-circuit from being generated by the terminal and an EMI (Electromagnetic Interference) shield can being brought into contact.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a camera module, the camera module comprising: a lens barrel including one or more sheets of lenses receiving an optical image of an object; an actuator moving the lens barrel; a holder supporting the lens barrel and the actuator; a substrate attached with the holder, mounted with an image sensor converting the optical image to an electrical signal, and formed with a through hole or a groove at an area of the holder; and a terminal protrusively formed at the holder area attached by the substrate, and electrically connected to the substrate by being inserted into the through hole or the groove to apply a power to the actuator.

In some exemplary embodiments, the image sensor may be mounted on an upper surface of the substrate.

In some exemplary embodiments, the image sensor may be mounted at a bottom surface of the substrate.

In some exemplary embodiments, the image sensor may be flip chip bonded to the bottom surface of the substrate.

In some exemplary embodiments, the camera module may further comprise a yoke embedding the lens barrel and the actuator and coupled to the holder.

In some exemplary embodiments, the actuator may be one of a VCM (Voice Coil Motor) actuator, an actuator driven by a piezoelectric force and a MEMS (Micro Electro Mechanical System) actuator driven by electrostatic capacity method.

In some exemplary embodiments, the terminal may be inserted into the through hole or the groove formed on the substrate to be electrically connected in a case the holder is attached to the substrate.

In some exemplary embodiments, the camera module may further comprise a conductive material formed at an area where the terminal protruded from the holder is electrically connected to the through hole or the groove formed on the substrate.

In some exemplary embodiments, the substrate may include an EMI (Electromagnetic Interference) shield can covering the substrate.

In some exemplary embodiments, the EMI shield can may cover the holder.

In some exemplary embodiments, a height of the EMI shield can may be higher than a height from a bottom surface of the EMI shield can to an upper surface of the holder exposed on the camera module.

In some exemplary embodiments, the substrate may be electrically connected to a FPCB (Flexible Printed Circuit Board) capable of being connected to an outside device.

In some exemplary embodiments, the FPCB may be bonded to a bottom surface of the substrate.

In some exemplary embodiments, the camera module may further comprise an EMI shield can capable of covering the substrate and the FPCB.

In some exemplary embodiments, the EMI shield can may include an insulation material at a surface corresponding to the FPCB.

In some exemplary embodiments, the EMI shield can may include an insulation material at a lateral surface corresponding to a surface of the FPCB.

In some exemplary embodiments, the EMI shield can may include an insulation material at a lateral surface and a surface corresponding to a surface of the FPCB.

In another general aspect of the present disclosure, there is provided a camera module, the camera module comprising: a substrate formed with a through hole or a groove; a holder including a terminal applying a power to an actuator moving a lens barrel and coupled to the substrate, wherein the terminal is electrically connected to the substrate by being inserted into the through hole or the groove.

In some exemplary embodiments, the camera module may further comprise an EMI shield can covering the substrate.

In still another general aspect of the present disclosure, there is provided a camera module, the camera module comprising: a substrate formed with a through hole or a groove; a holder including a terminal applying a power to an actuator moving a lens barrel and coupled to the substrate, wherein the terminal is electrically connected to the substrate by being inserted into the through hole or the groove, and wherein the through hole or the groove is formed at a central area of a holder area coupled by the substrate.

The camera module according to exemplary embodiments of the present disclosure have an advantageous effect in that a terminal electrically connected to an actuator is not exposed to an outer surface of a structure coupled by a holder and a substrate to reduce an influence of electromagnetic wave transmitted from outside.

Another advantageous effect is that a lateral surface of a substrate of the camera module is covered by an EMI (Electromagnetic Interference) shield to allow a terminal to be positioned inside the camera module, whereby a short-circuit is prevented from being generated by the terminal and an EMI (Electromagnetic Interference) shield can being brought into contact.

Other exemplary aspects, advantages, and salient features of the disclosure will become more apparent to persons of ordinary skill in the art from the following detailed description, which, taken in conjunction with the annexed drawings, discloses exemplary embodiments of the invention.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
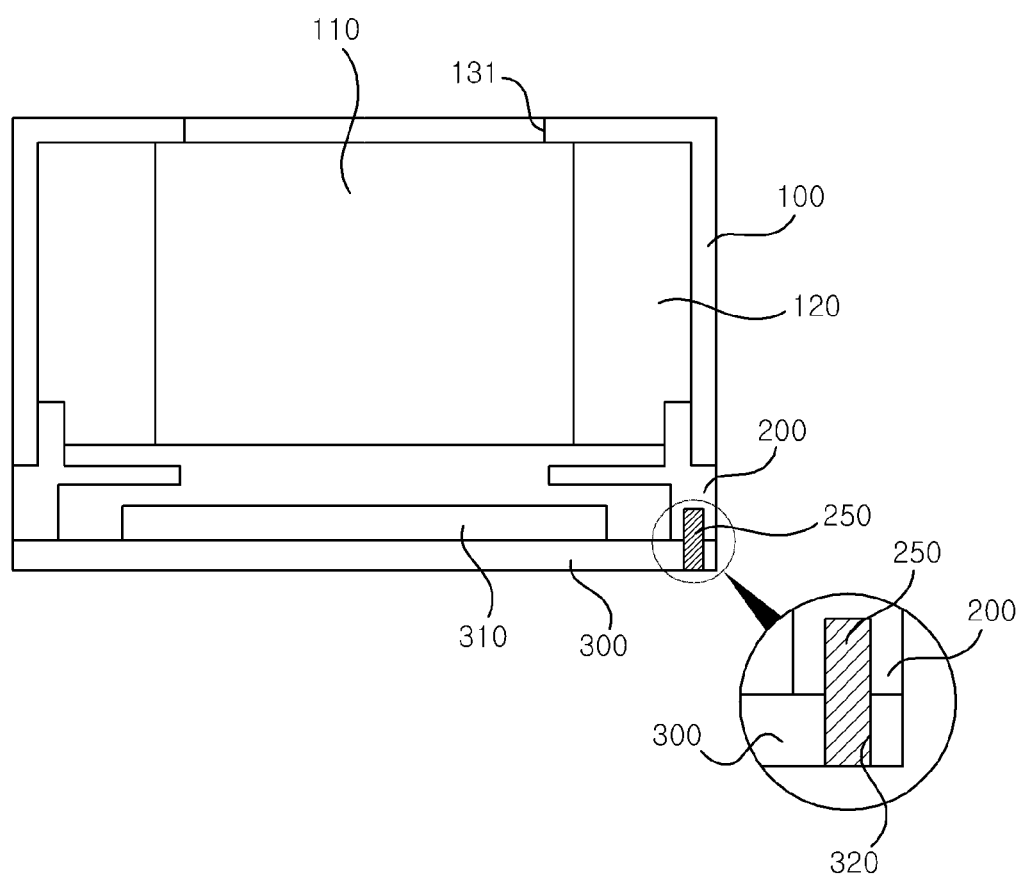
FIG. 1 is a schematic cross-sectional view illustrating a camera module according to an exemplary embodiment of the present disclosure.

FIG. 1 is a schematic cross-sectional view illustrating a camera module according to an exemplary embodiment of the present disclosure.

The camera module according to an exemplary embodiment of the present disclosure includes a lens barrel (110) including one or more sheets of lenses receiving an optical image of an object, an actuator (120) moving the lens barrel (110), a holder (200) supporting the lens barrel (110) and the actuator (120); a substrate (300) attached with the holder (200), mounted with an image sensor (310) converting the optical image to an electrical signal, and formed with a through hole (320) or a groove at an area of the holder (200); and a terminal (250) protrusively formed at the holder (200) area attached by the substrate (300), and electrically connected to the substrate (300) by being inserted into the through hole (320) or the groove to apply a power to the actuator (120).

The image sensor (310) may be mounted at an upper surface or a bottom surface of the substrate (300), and in a case the image sensor (310) is mounted at the bottom surface of the substrate (300), the substrate (300) may be flip chip bonded to the image sensor (310) using the substrate (300).

Furthermore, the camera module may further comprise a yoke (100) including the lens barrel (110) and the actuator (120) therein and coupled to the holder (200). The yoke (100) includes the lens barrel (110) and the actuator (120) therein to perform a protection function, and at the same time, may be formed with a metal can to block an outside electromagnetic wave. The yoke (100) is formed with a window (131) to allow light of an object to be incident on the lens.

The actuator (120) moves the lens barrel to a direction of an optical axis for auto focusing. The actuator (120) may include one of a VCM (Voice Coil Motor) actuator, an actuator driven by a piezoelectric force and a MEMS (Micro Electro Mechanical System) actuator driven by electrostatic capacity method. In addition, the substrate (300) may include a ceramic substrate, a PCB and any equivalent support unit capable of supporting the yoke (100) and the holder (200).

Meanwhile, the through hole (320) or the groove may be formed at a central area of an area coupled by the substrate (300).

In this case, the terminal (250) is inserted into the through hole (320) or the groove, after the holder (200) is coupled to the substrate (300), to be electrically connected to the substrate (300), whereby the terminal is prevented from being exposed from an outer surface of the holder (200) and the substrate (300), such that even if the camera module is covered by the EMI shield can (described later), the terminal (250) and the EMI shield can are not contacted each other.

As described above, the camera module according to the present disclosure is configured such that the terminal (250) applying a power to the actuator (120) is protruded from the holder (200) area attached by the substrate (300), and in a case the holder (200) is attached to the substrate (300), the terminal (250) is inserted into the through hole (320) or the groove formed on the substrate (300) to be electrically connected.

At this time, the through hole (320) or the groove is formed with a coated film of a conductive material, and the terminal (250) and the through hole (320) or the groove are electrically connected the moment the terminal is inserted. It is also possible to additionally use an adhesive material including a conductive epoxy, for example.

Furthermore, the through hole (320) or the groove is electrically connected to a circuit pattern wired to the substrate (300), such that in a case the FPCB (described later) is electrically connected to the substrate (300), an electrical signal is received by an outside device connected to the FPCB.

Thus, the present disclosure can reduce an influence of electromagnetic wave transmitted from outside, because the terminal (250) is not exposed to an outer surface of a structure coupled by the holder (200) and the substrate (300).

As a result, as will be described later, the terminal (250) is positioned inside the camera module to allow the terminal and the EMI shield can to be brought into contact and to prevent short-circuit from occurring, in a case a lateral surface of the substrate of the camera module is covered by an EMI shield can.

Figure 2A:
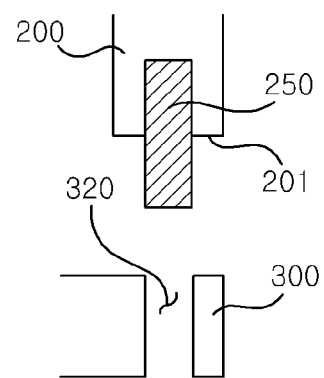
FIGS. 2a and 2b are partial cross-sectional views illustrating a state where a terminal of a camera module and a substrate are coupled according to an exemplary embodiment of the present disclosure.
Figure 2B:
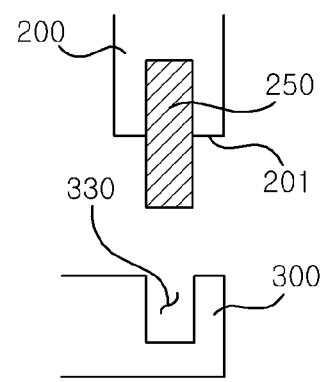

FIGS. 2a and 2b are partial cross-sectional views illustrating a state where a terminal of a camera module and a substrate are coupled according to an exemplary embodiment of the present disclosure.

As described above, the terminal (250) formed at the holder (200) is protruded from a holder area (201) abutted by the substrate (300). Furthermore, the camera module is assembled by the holder (200) being attached to the substrate (300).

At this time, the substrate (300) must be formed with a through hole (320) or a groove (330) insertable by the terminal (250), and as illustrated in FIG. 2a, the terminal (250) is inserted into the through hole (320) in a case the holder (200) is attached to the substrate (300).

Furthermore, as shown in FIG. 2b, the terminal (250) is inserted into the groove (330) formed at the substrate (300).

Figure 3:
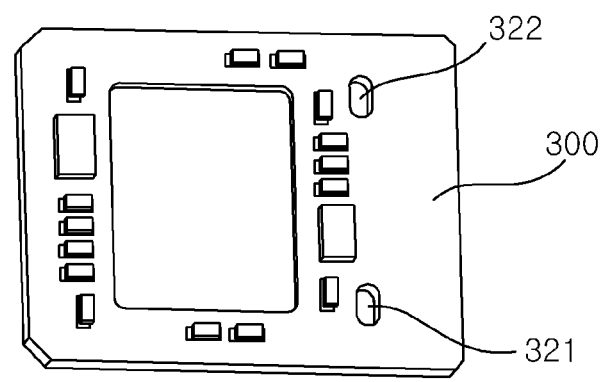
FIG. 3 is a schematic perspective view illustrating a substrate of a camera module according to an exemplary embodiment of the present disclosure.
Figure 4:
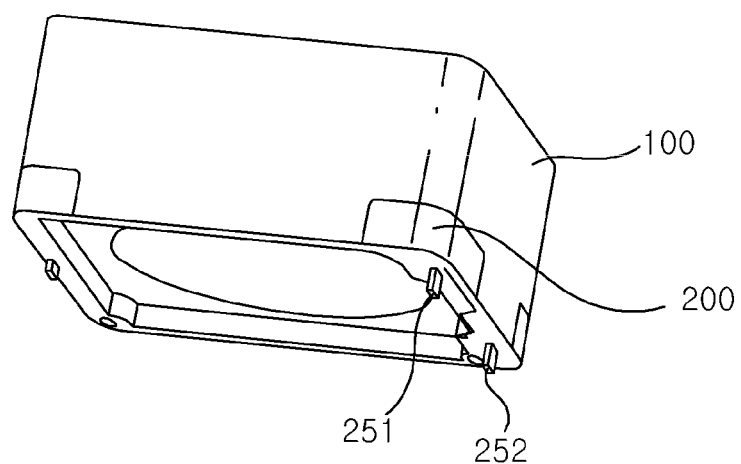
FIG. 4 is a schematic perspective view illustrating a terminal of a holder at a camera module according to an exemplary embodiment of the present disclosure.
Figure 5:
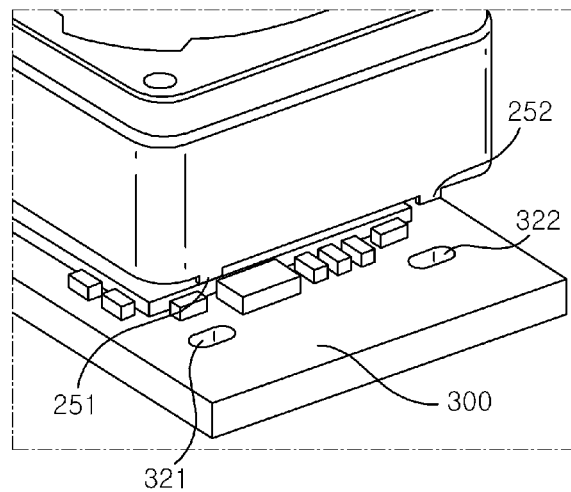
FIG. 5 is a schematic perspective view illustrating a state where a holder of a camera module is coupled to a substrate according to an exemplary embodiment of the present disclosure.

FIG. 3 is a schematic perspective view illustrating a substrate of a camera module according to an exemplary embodiment of the present disclosure, FIG. 4 is a schematic perspective view illustrating a terminal of a holder at a camera module according to an exemplary embodiment of the present disclosure, and FIG. 5 is a schematic perspective view illustrating a state where a holder of a camera module is coupled to a substrate according to an exemplary embodiment of the present disclosure.

First, as shown in FIG. 3, a substrate (300) of the camera module according to an exemplary embodiment of the present disclosure is formed with through holes (321, 322) or a groove to accommodate terminals, as shown in FIG. 3. Furthermore, as shown in FIG. 4, terminals (251, 252) are protruded from a distal end of a holder (200) coupled to a yoke (100). In addition, as illustrated in FIG. 5, the substrate (300) is formed with through holes (321, 322) or a groove.

Therefore, in a case the holder (200) coupled to the yoke (100) is attached to the substrate (300), the terminals (252, 252) protruded from the distal end of the holder (200) are inserted into the through holes (321, 322) or the groove formed on the substrate (100). Of course, it is possible to additionally coat a conductive material such as a conductive epoxy, for example.

A coupled structure between the holder and the yoke is not limited thereto. For example, the present disclosure may include a holder structure including a yoke, and it should be apparent to the skilled in the art that position and size of the yoke, and a coupled structure with the holder may be changed and/or accepted in response to a design change.

Figure 6:
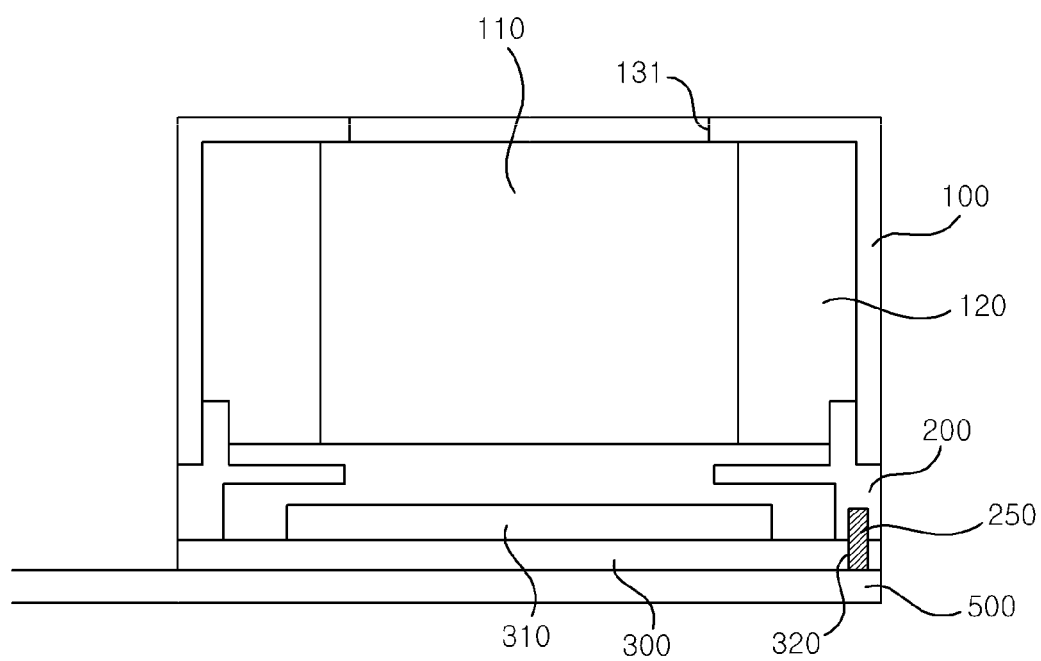
FIG. 6 is a partial cross-sectional view illustrating an FPCB being bonded to a substrate of a camera module according to an exemplary embodiment of the present disclosure.
Figure 7:
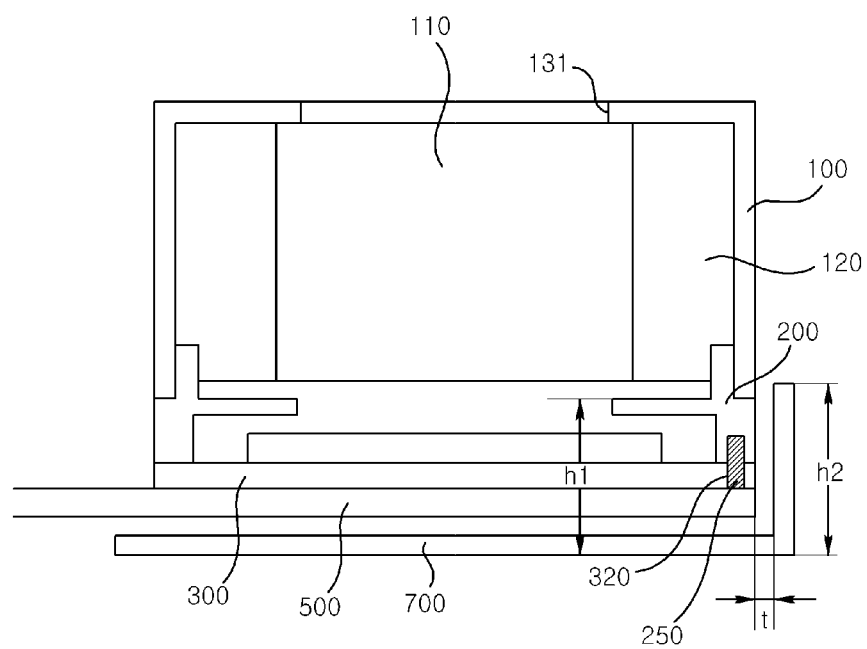
FIG. 7 is a schematic perspective view illustrating an EMI shield can being mounted on a camera module according to an exemplary embodiment of the present disclosure.
Figure 8:
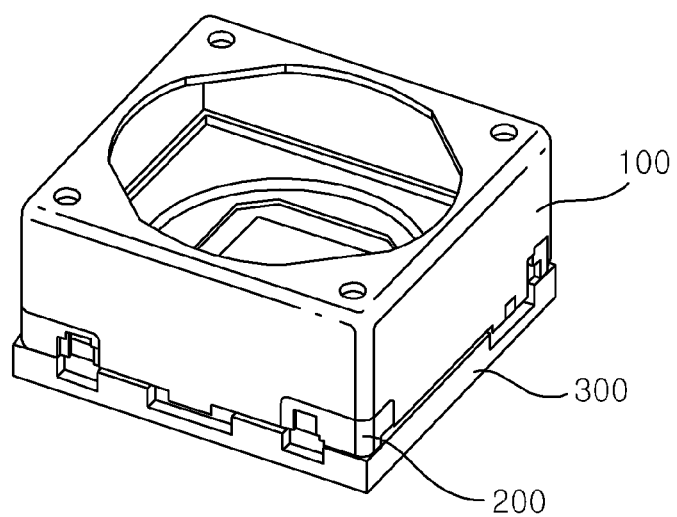
FIG. 8 is a schematic perspective view illustrating a state where a yoke, a holder and a substrate are assembled according to an exemplary embodiment of the present disclosure.

FIG. 6 is a partial cross-sectional view illustrating an FPCB being bonded to a substrate of a camera module according to an exemplary embodiment of the present disclosure, FIG. 7 is a schematic perspective view illustrating an EMI shield can being mounted on a camera module according to an exemplary embodiment of the present disclosure, and FIG. 8 is a schematic perspective view illustrating a state where a yoke, a holder and a substrate are assembled according to an exemplary embodiment of the present disclosure.

As expounded in the foregoing, terminals (251, 252) protruded from a distal end of a holder (200) coupled to a yoke (100) are inserted into through holes (321, 322) or a groove, an assembly process is performed in which the holder (200) coupled to the yoke (100) is attached to a substrate (300), and the substrate (300) is electrically connected to an FPCB (500) connectible to an outside device.

For reference, although FIG. 6 has illustrated that the substrate (300) is bonded at a bottom surface thereof to the FPCB (500), a position relationship between the FPCB (500) and the substrate (300) may be variably changed, and is not restricted to what is illustrated in FIG. 6.

Furthermore, the camera module according to an exemplary embodiment of the present disclosure may be formed with an EMI shield can (700). At this time, the EMI shield can (700) must be installed at least to cover the substrate (300). Furthermore, the EMI shield cover (700) can cover the substrate (300) and the holder (200).

At this time, a height (h2) of the EMI shield can (700) may be designed to be higher than a height (h1) from a bottom surface of the EMI shield can (700) to an upper surface of the holder (200) exposed on the camera module. The EMI shield can (700) may not be installed at an area where the FPCB (500) is extended to an outside. In addition, the EMI shield can (700) may include an insulation material at a surface corresponding to the FPCB, or at a lateral surface corresponding to a surface of the FPCB, or taped by an insulation tape, whereby an electrical short-circuit between the EMI shield can (700) and the FPCB (500) can be prevented.

Furthermore, as illustrated in FIG. 8, the abovementioned terminal in the camera module according to the present disclosure is prevented from being exposed while the yoke (100), the holder (200) and the substrate (300) are assembled.

The above-mentioned camera module according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:
1. A camera module, the camera module comprising:
a lens barrel including at least one lens;

an actuator moving the lens barrel;

a terminal electrically connected to the actuator;

a holder supporting the actuator;

a substrate mounted with an image sensor and coupled with the holder at a coupling area with a through hole or a groove;

a yoke coupled to the holder, and covering the actuator; and an EMI (Electromagnetic Interference) shield can covering the substrate, wherein the terminal is protrusively disposed at the coupling area and is electrically connected to the substrate by being inserted into the through hole or the groove to apply a power to the actuator, wherein the terminal is spaced from the yoke, wherein the EMI shield can covers at least a portion of the holder, and wherein a height of the EMI shield can is higher than a height from a bottom surface of the EMI shield can to an upper surface of the holder exposed on the camera module.

2. The camera module of claim 1, wherein the image sensor is mounted on an upper surface of the substrate.

3. The camera module of claim 1, wherein the image sensor is mounted at a bottom surface of the substrate.

4. The camera module of claim 3, wherein the image sensor is flip chip bonded to the bottom surface of the substrate.

5. The camera module of claim 1, wherein the actuator is one of a VCM (Voice Coil Motor) actuator, an actuator driven by a piezoelectric force and a MEMS (Micro Electro Mechanical System) actuator driven by electrostatic capacity method.

6. The camera module of claim 1, wherein the terminal is inserted into the through hole or the groove formed on the substrate to be electrically connected in a case the holder is attached to the substrate.

7. The camera module of claim 6, further comprising a conductive material disposed at an area where the terminal protruded from the holder is electrically connected to the through hole or the groove formed on the substrate.

8. The camera module of claim 1, wherein the substrate is electrically connected to a FPCB (Flexible Printed Circuit Board) capable of being connected to an outside device.

9. The camera module of claim 8, wherein the FPCB is bonded to a bottom surface of the substrate.

10. The camera module of claim 8, further comprising an EMI shield can capable of covering the substrate and the FPCB.

11. The camera module of claim 10, wherein the EMI shield can includes an insulation material at a surface corresponding to the FPCB.

12. The camera module of claim 10 wherein the EMI shield can includes an insulation material at a lateral surface corresponding to a surface of the FPCB.

13. The camera module of claim 10, wherein the EMI shield can includes an insulation material at a lateral surface and a surface corresponding to a surface of the FPCB.

14. The camera module of claim 1, wherein the terminal is not exposed outside the holder.

* * * * *